United States Patent

[11] 3,578,216

[72] Inventor William S. Pearson
 225 N. First St., Hampstead, Md. 21074
[21] Appl. No. 780,708
[22] Filed Dec. 3, 1968
[45] Patented May 11, 1971

[54] PREVENTION OF ARCHING COMPACTION OF DISCRETE MATERIAL IN GRAVITY FEED HOPPERS
 10 Claims, 1 Drawing Fig.

[52] U.S. Cl. .................................................. 222/195
[51] Int. Cl. .................................................. B65g 3/12, B65g 69/06

[50] Field of Search .......................................... 222/195, 1

[56] References Cited
 UNITED STATES PATENTS
 3,225,963 12/1965 Arpajian ................... 222/195
 3,305,142 2/1967 Caldwell ................... 222/195
 3,452,865 7/1969 Eckhardt ................... 222/195

Primary Examiner—George T. Hall
Attorney—Hill, Sherman, Meroni, Gross & Simpson

ABSTRACT: Arching compaction of discrete material in gravity feed hoppers is prevented by directing a stream of fluid upwardly from adjacent to the discharge outlet of the hopper.

Patented May 11, 1971
3,578,216
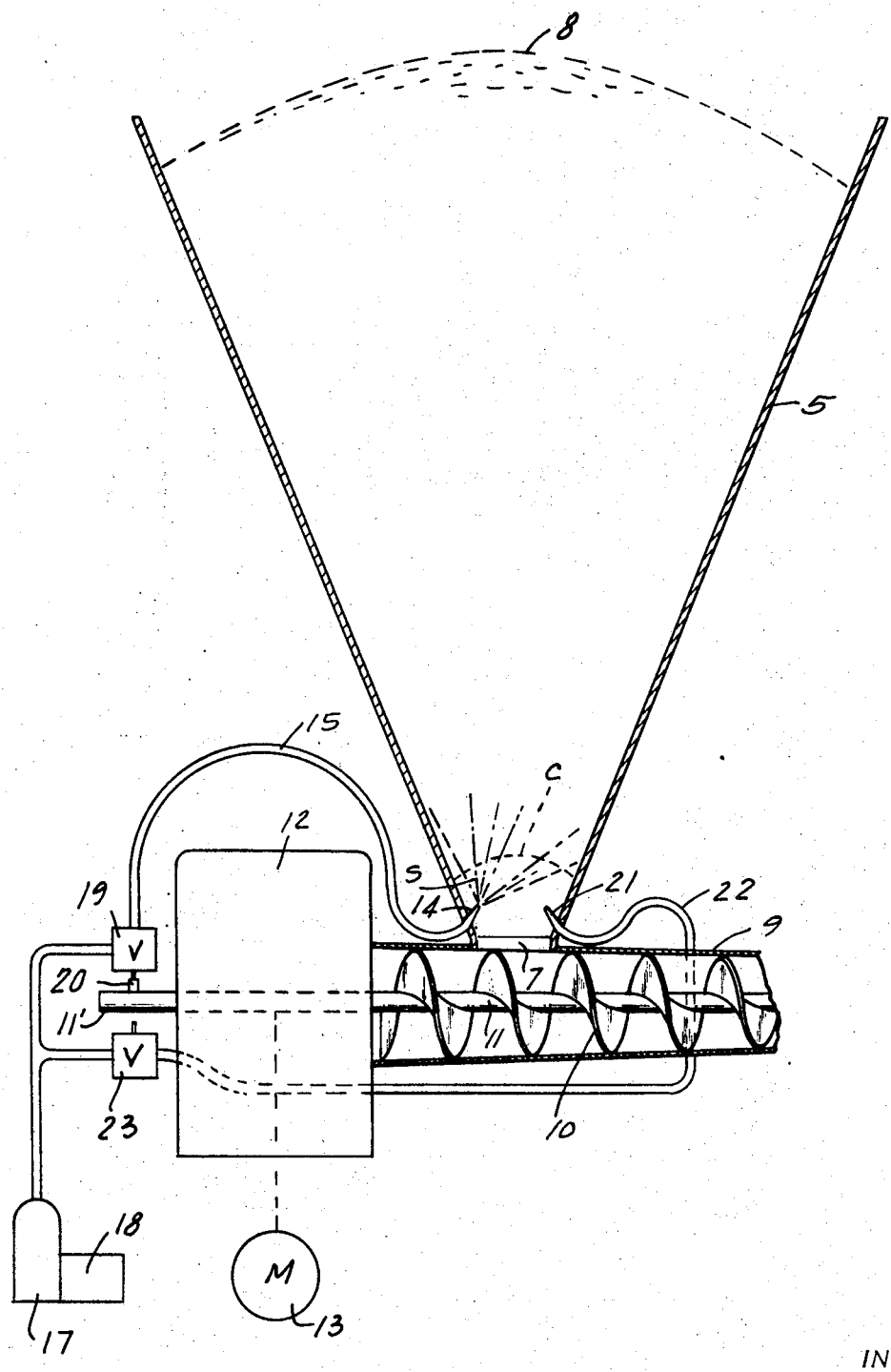
INVENTOR.
WILLIAM S. PEARSON
BY *[signature]* ATTORNEYS

PREVENTION OF ARCHING COMPACTION OF DISCRETE MATERIAL IN GRAVITY FEED HOPPERS

This invention relates to gravity feeding of discrete material from hoppers in which the material is contained, and more particularly concerns the elimination of the flow-disrupting effects of arching compaction of the material in the hopper.

Many types of discrete materials have a propensity for arching compaction where a mass of the material is contained in a hopper from which the material is fed gravitationally from a lower discharge outlet. In respect to relatively rough textured materials arching compaction is often an acute problem, especially where feeding is at a relatively slow rate compared to input or replenishing material supplied to the hopper, where feed demand from the hopper is intermittent of subject to shut downs, where operating machinery vibrations affect the hopper, where mechanical stirring of the hopper contents is impractical or undesirable, and the like. As an example of materials especially liable to arching compaction may be mentioned wood shavings, raw plastic material, and the like. Discrete or pelletized plastic material as fed to an extruder or injection molding machine, and more especially regrinds, namely, ground up scrap material which is returned for reuse with or without addition of virgin material presents this problem.

According to the principles of the invention, the aforementioned problems and difficulties are overcome and gravity feed efficiency is promoted and enhanced by inhibiting the arching compaction propensity of the material in a gravity feed hopper by directing one ore more streams of material-flow enhancing fluid upwardly from adjacent to the discharge outlet of the hopper into the mass of material.

An important object of the present invention is to prevent arching compaction of discrete material in a gravity feed hopper having a lower discharge outlet.

Another object of the invention is to provide a new and improved method of and means for preventing arching compaction of discrete material in gravity feed hoppers by directing one or more streams of fluid in counterdirection to the gravity feed path of the material.

A further object of the invention is to prevent arching compaction of discrete material in gravity feed hoppers by periodically subjecting the compaction zone in the material to the effects of compaction inhibiting fluid.

Other objects, features and advantages of the present invention will be readily apparent from the following description of a representative embodiment thereof taken in conjunction with the accompanying drawing, in which:

The FIGURE is a schematic illustration of a gravity feed hopper operatively associated with a plastic extruder.

Referring to the drawing, a hopper 5 of a desirable size and shape, and shown as of the generally downwardly tapered funnel shape, has a lower end outlet 7 and a substantial capacity for a mass of discrete material to be gravity fed to and through the outlet.

By way of example of one practical use for the hopper 5, it is shown as mounted to feed into the receiving end portion of a plastic extruder casing or housing 9 within which a feed screw 10 is driven rotatably on a shaft 11 from a gear box or the like 12 receiving driving power from a motor 13. For this purpose, the material 8 comprises pelletized, ground or reground plastic raw material or stock or mixtures thereof, the material feeding by gravity through the outlet 7 into the extruder housing 9 at a rate of demand controlled by the extruder feed screw 10.

A major problem with gravity feeding of certain discrete materials, and more particularly plastic stock materials for extrusion shaping, injection molding, and the like is that it has a tendency to compact and arch over adjacent to the hopper outlet where it is impractical or at least undesirable to provide some sort of stirring means to prevent arching. For example, in a vertical feed arrangement where the feed screw for the extruder has its axis aligned with the hopper outlet, it has been customary to provide an extension from the screw to enter the outlet and stir the material in the compaction zone thereabove to promote freedom of gravity flow. In a horizontal arrangement as depicted in the drawing, however, such a stirring device is not possible from below the opening, and it would be necessary to have the stirring device mounted to extend down through the mass of material, providing a more or less complex arrangement and interfering with access to the top of the hopper. Further, such a top mounted or downwardly extending stirring device must work down through the entire mass, whereas the compaction zone is actually close to the bottom of the hopper where the hopper takes on a more or less narrow nozzle form, as indicated in dash outline at C in the drawing.

According to the present invention arching compaction of the material 8 is prevented by directing at least one stream S upwardly in reverse direction to the downward gravity flow of the material from adjacent to the outlet 7 and into the mass of material, especially in the compaction zone C. With this stream arching compaction is inhibited. This effect is attained partially, at least, by virtue of agitation of the material and partially due to a generally lubricating effect of the fluid, with air being the preferred fluid, whereby the particles of material tend to flow freely even under the pressure head of the superposed material. Although the air stream may be continuous when required, it may be, and has been successfully utilized in the form of an intermittent air blast.

In one practical arrangement, the air stream nozzle 14 is located adjacent to the perimeter of the lower end of the hopper 5 defining the opening 7 and directed upwardly with its discharge axis suitably oriented relative to the axis of descent of and countercurrent or in reverse direction to the flow of the material 8 and toward the compaction zone C. Fluid for the stream S is desirably compressed air, delivered through a duct or conduit 15 connected thereto from outside the hopper 5. Air supply is derived from any suitable source such as a compressed air tank 17 charged by a compressor 18 and with which the delivery duct 15 communicates operatively. For intermittent air blast operation, control means in the form of a valve 19 are connected in the delivery duct 15. Desirably the valve 19 is of the normally closed type and means for periodically opening the valve may be an electrical relay, solenoid, or the like, but herein conveniently comprise a suitable operating cam 20 on the extruder screw shaft 11, in this instance on a stub portion 11' of the shaft outside the housing 12. To activate the air stream, the valve 19 may be opened once in each revolution of the shaft 11, although if preferred a plurality of cams may be provided about the shaft to open the valve 19 a corresponding plurality of times in each revolution. The duration of each air blast may also be controlled by the length of time the valve is held open by the cam. The intensity of blast may be controlled by the air pressure supplied, as deemed best suited for maintaining free flow of the particular material being handled in the hopper 5 and its propensity to cake or arch.

If desired, a plurality of air streams may be employed located in complementary relation to the stream S from the nozzle 14. For example, a second air jet or blast nozzle 21 may be mounted within the lower end of the hopper 5 at the opposite side of the opening 7 from the nozzle 14 and is supplied with compressed air through a delivery duct 22 comprising a branch from the delivery duct 15, or directly connected to the air supply tank 17, but in any event upstream from the valve 19 and desirably under the control of a valve 23 which may also be a normally closed valve and opened periodically and sequentially relative to the valve 19 by the cam 20. Any other suitable timing in operation of the nozzle 21 may be effected, similarly as explained for the nozzle 14. If preferred dual cams may be mounted on the shaft portion 11' so that both of the valves 19 and 23 are operated at the same time. Further, the vertical relationship of the nozzles 14 and 21 may be the same or they may be offset relative to one another, depending on the compaction propensity of the material being handled, the size of the hopper 5, and other related factors. In other words, a plurality of nozzles may be correlated to operate individually and serially, collectively, by vertical stages, and the like, and there may be as many nozzles as desirable to attain free flow of the material to the outlet of the hopper.

It will be understood that variations and modifications may be effected without departing from the spirit and scope of the novel concepts of this invention.

I claim:

1. A method of preventing arching compaction of discrete material in a gravity feed hopper having a lower discharge outlet and a normal arching compaction zone of the material in an area above the outlet, comprising:

directing a stream of fluid from a nozzle upwardly from adjacent to said discharge outlet but below the compaction zone and into the material countercurrent to flow of the material in the hopper; and with said stream agitating the material and inhibiting the arching compaction propensity of the material whereby to assure free feeding flow of the material to said outlet.

2. A method according to claim 1, comprising directing said stream as an air blast acting on substantially the entire compaction area.

3. A method according to claim 1, comprising directing a plurality of fluid streams upwardly in the manner of said first mentioned stream.

4. A method according to claim 1, including receiving the material from said outlet and conveying the material away therefrom by operating a rotary drive shaft, and effecting intermittent delivery of fluid to said nozzle responsive to rotations of said shaft.

5. A method according to claim 3, including receiving and conveying the material away from said outlet by means having a rotary drive shaft, and effecting timed directing of said plurality of fluid streams responsive to rotations of said shaft.

6. Means for preventing arching compaction of discrete material in a gravity feed hopper having a lower discharge outlet and a normal arching compaction zone of the material in an area above said outlet, comprising:

a nozzle for directing a stream of fluid upwardly from adjacent to said discharge outlet but below said compaction zone and into the material countercurrent to flow of the material in the hopper;

said stream being operative to agitate the material to inhibit the arching compaction prepensity of the material whereby to assure gravity feed material flow to said outlet.

7. Means according to claim 6, including means for supplying air to said nozzle as the fluid, said nozzle being operative to direct the air as a blast acting on substantially the entire compaction area.

8. Means according to claim 6, comprising a plurality of stream-directing nozzles located in complementary relation to one another and relative to said outlet and operative to direct respective streams upwardly into the compaction zone in the material.

9. Means according to claim 8, including means receiving material flowing from said hopper through said outlet and conveying the material away therefrom and having a rotary drive shaft, means for supplying fluid to said nozzles including respective control valves, and means on said shaft operative in the rotation of the shaft to control said valves to effect timed delivery of fluid to said nozzles.

10. Apparatus incorporating the means according to claim 6, and comprising, means receiving material flowing from said hopper through said outlet and conveying the material away therefrom including a rotary drive shaft, means for supplying fluid to said nozzle including a control valve, and means on said shaft operative to control said valve to effect intermittent delivery of fluid to said nozzle.